No. 716,574. Patented Dec. 23, 1902.
A. NIMMO.
METHOD OF TREATING ANIMALS.
(Application filed May 24, 1902.)
(No Model.)
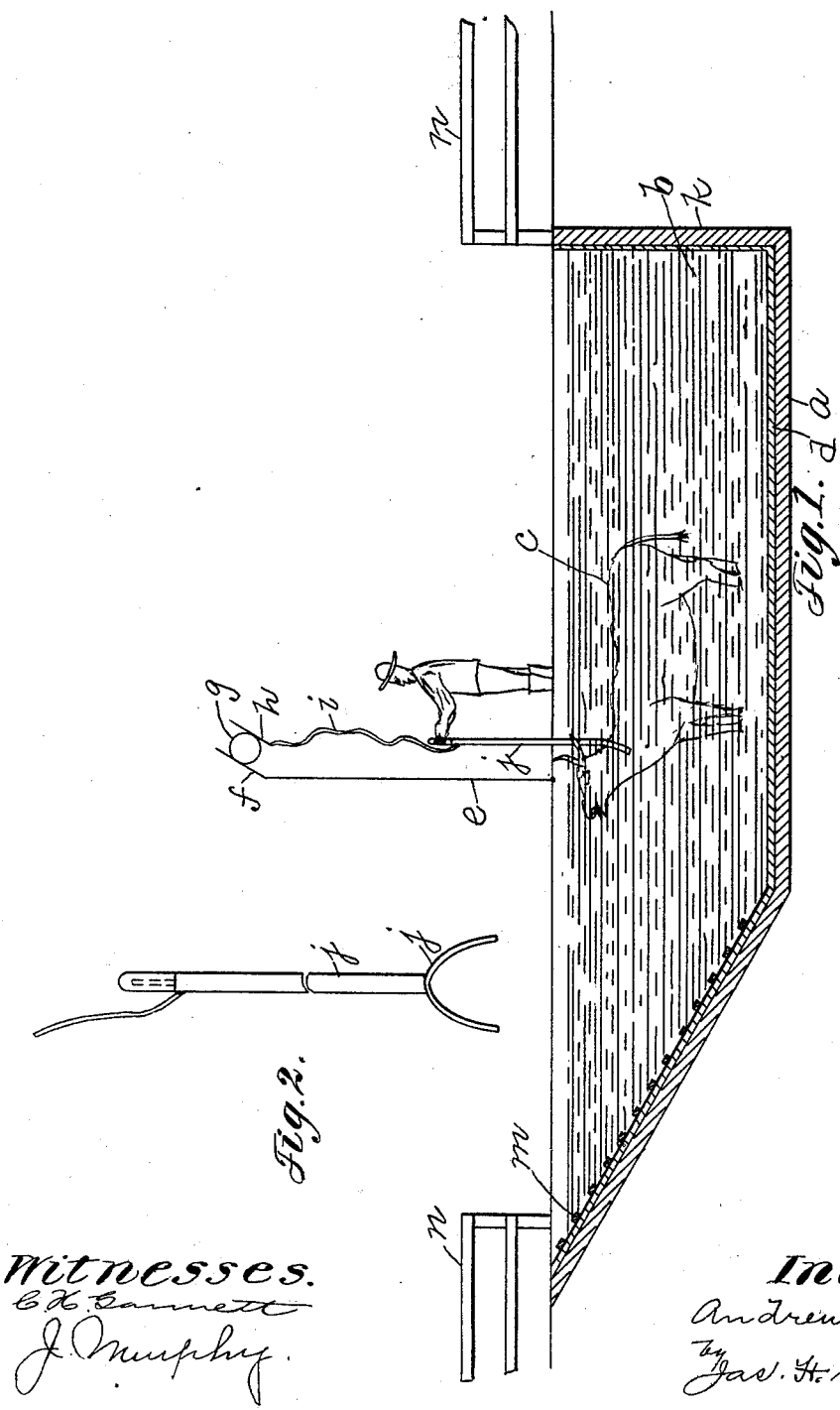
Witnesses.
C. H. Garnett
J. Murphy.
Inventor.
Andrew Nimmo
by Jas. H. Churchill
atty.

UNITED STATES PATENT OFFICE.

ANDREW NIMMO, OF GROTON, MASSACHUSETTS.

METHOD OF TREATING ANIMALS.

SPECIFICATION forming part of Letters Patent No. 716,574, dated December 23, 1902.

Application filed May 24, 1902. Serial No. 108,864. (No model.)

*To all whom it may concern:*

Be it known that I, ANDREW NIMMO, a citizen of the United States, residing in Groton, in the county of Middlesex and State of Massachusetts, have invented an Improvement in Methods of Treating Animals, of which the following description, in connection with the accompanying drawings, is a specification, like letters on the drawings representing like parts.

This invention relates to a novel method of treating animals for the purpose of freeing them from parasites.

The invention, among other uses, is particularly adapted for treating cattle to free them from fever-ticks, (or *boophilus-bovus*.)

In accordance with this invention I employ a current of electricity, which is passed through the body of the animal while the latter is submerged in a bath of water or water to which is added a small amount of acid—such, for instance, as acetic acid—which is present in such small amount as not to have any injurious effect on the eyes of the animal, but which will add to the conductivity of the bath, so that a weak current or one of low voltage may be sufficient to kill the tick without in the least affecting the animal. These and other features of this invention will be pointed out in the claims at the end of this specification.

Figure 1 represents in section and elevation one form of apparatus with which to practice this invention, and Fig. 2 a detail to be referred to.

Referring to the drawings, $a$ represents a vat, of wood or other suitable substance, of any desired or suitable size and of a depth sufficient to contain a body $b$, of water or other solution, in which the animal $c$ can be submerged. The vat $a$ may be provided with a lining $d$, of copper or other metal, which in practice may be connected by a wire $e$ to one pole or brush $f$ of a current-generator $g$, preferably an alternating-current generator of low voltage, the other pole or brush $h$ of which is connected by wire $i$ to a portable terminal $j$, which may be of any suitable construction, but preferably such as herein shown, it consisting of a metal yoke or fork on the end of a staff or rod, which is designed to be grasped by the operator, who places the forked portion over the neck of the animal as the latter is swimming through the vat, and by suitable pressure forces the head of the animal beneath the surface of the bath, so that all parts of the animal are exposed to the action of the current, which passes from the portable terminal $j$ through the animal and the ticks affixed thereto through the bath to the negative terminal or electrode of the bath. The ticks referred to bury their heads in the hide or skin of the animal and their bodies project outward into the vat, thus offering an easy passage for the current of electricity through them into the bath. In this manner the ticks are electrocuted and the animal leaves the bath freed from live ticks.

The vat $a$ in practice will preferably be made long enough to compel the animal to swim a sufficient distance to enable the operator to submerge the head of the animal one or more times, as desired. The animal may be pushed or forced into the vat at one end, which may be designated the "entrance" end and may have a straight wall $k$, as shown, and the opposite or outlet end is inclined and provided with slats or bars $m$ to enable the animal to walk out of the vat. The entrance to and the exit from the vat may be provided with suitable guards or fences $n$.

I claim—

1. The method of freeing animals from parasites, which consists in completely immersing the animal in a bath, and passing a current of electricity through said animal and the parasite while so immersed, substantially as and for the purpose specified.

2. The method of freeing animals from parasites, which consists in completely immersing the animal in a bath, and passing an alternating current of substantially low voltage through the said animal and the parasite while so immersed, substantially as and for the purpose specified.

In testimony whereof I have signed my name to this specification in the presence of two subscribing witnesses.

ANDREW NIMMO.

Witnesses:
JAS. H. CHURCHILL,
J. MURPHY.